United States Patent [19]

Mendenhall

[11] 4,189,784
[45] Feb. 19, 1980

[54] ADAPTIVE CIRCUIT FOR EXTRACTING TIMING INFORMATION FROM A REPETITIVE SERIES OF TIME COHERENT PULSES

[75] Inventor: Charles E. Mendenhall, Campbell, Calif.

[73] Assignee: Sperry Rand Corporation, New York, N.Y.

[21] Appl. No.: 972,316

[22] Filed: Dec. 22, 1978

[51] Int. Cl.² ............................................... G11C 11/40
[52] U.S. Cl. ..................................... 365/233; 307/269
[58] Field of Search ................ 365/149, 233; 307/208, 307/239, 240, 269

[56] References Cited
U.S. PATENT DOCUMENTS 4,090,096  5/1978  Nagami .................................. 365/233

Primary Examiner—Terrell W. Fears
Attorney, Agent, or Firm—Thomas H. Olson; Eugene T. Battjer; William E. Cleaver

[57] ABSTRACT

A circuit for discriminating among pulses in a series of recurring pulses based on the interval between adjacent pulses which circuit is particularly useful in extracting timing information from a series of pulses such as are induced in a servo head by movement relative thereto of a prerecorded servo track in a disc pack data storage system. The circuit includes a monostable multivibrator for producing a timing signal having a duration corresponding to the time interval between two successive pulses. The monostable multivibrator output is stored, for example in a data flip flop, so as to produce an output pulse from the flip flop if a succeeding pulse in the series occurs while the monostable multivibrator output is high. A feedback circuit connects the output pulse to the timing circuit of the monostable multivibrator to alter the duration of the timing signal produced by the monostable multivibrator in accordance with changes in frequency of the recurring pulses so as to maintain constant the width of the output pulse notwithstanding variation of the frequency of the pulse series. The feedback circuit includes an integrator which effects a reduction in band width of the feedback circuit so that noise pulses or the like that occur at random times have insignificant effect on the circuit and on the output pulses produced thereby.

5 Claims, 2 Drawing Figures

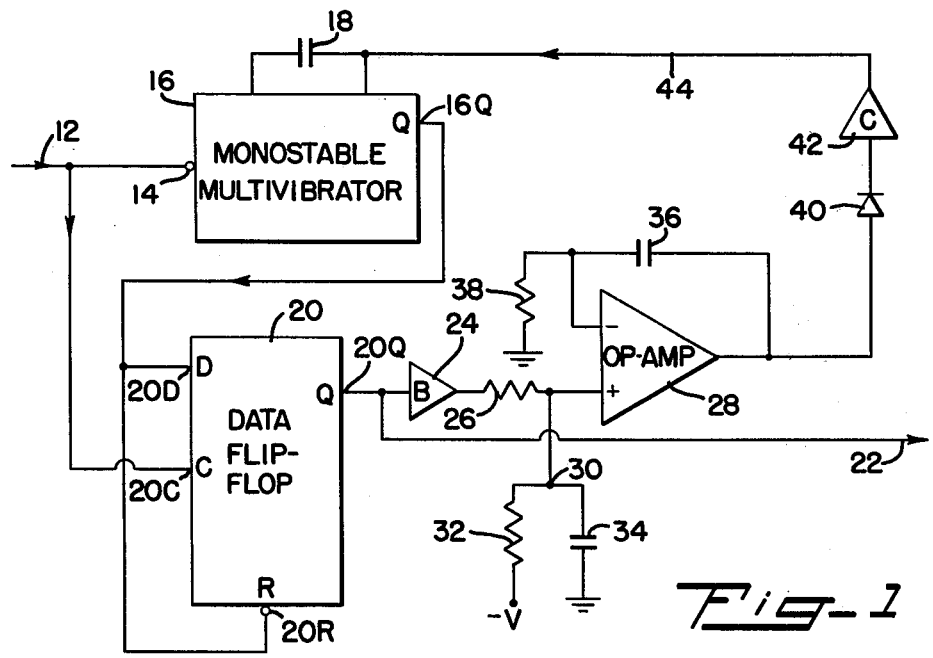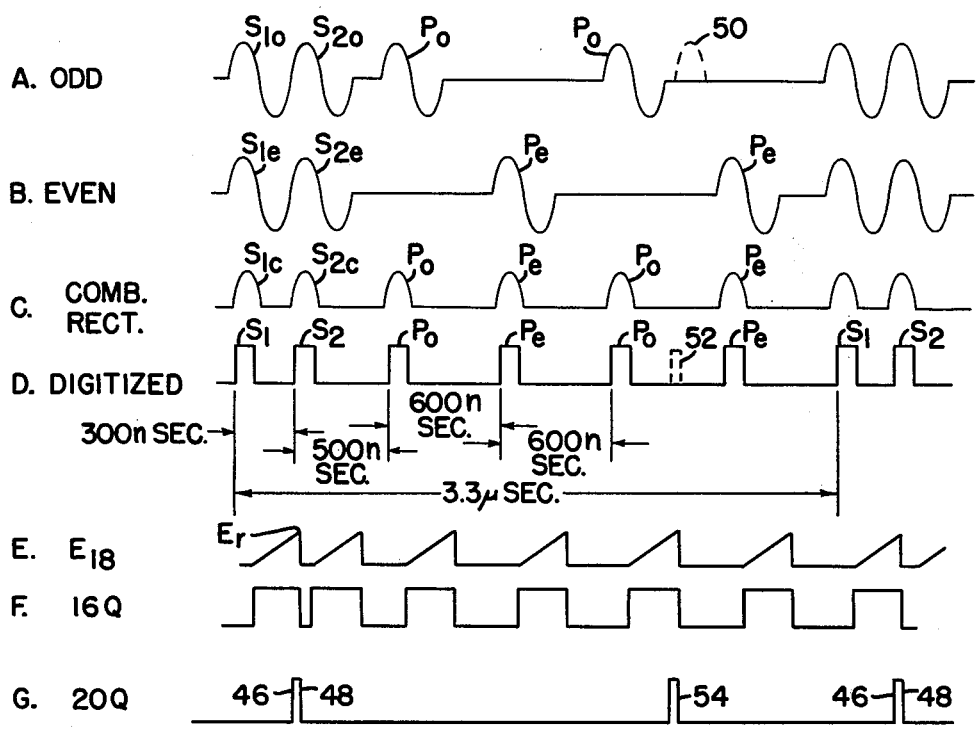

ADAPTIVE CIRCUIT FOR EXTRACTING TIMING INFORMATION FROM A REPETITIVE SERIES OF TIME COHERENT PULSES

BACKGROUND OF THE INVENTION

1. Field of the Invention

This invention relates to a circuit for discriminating among pulses in a pulse sequence in accordance with the time interval between adjacent pulses to produce timing pulses of substantially constant width irrespective of the frequency of the pulses in the pulse sequence. More particularly, the invention relates to a circuit producing accurate timing pulses in a monopulse servo system employed in a disc pack data storage apparatus.

2. Description of the Prior Art

Disc pack data storage systems typically include at least one surface on which servo data are prerecorded and are used to generate timing information and position information for other parts of the system.

Among the techniques for recording the servo data is a system known as the dipulse system. The dipulse system is exemplified by U.S. Pat. No. 3,534,344 to Santana, which discloses servo tracks having odd dipulses alternating with servo tracks having even dipulses. Servo read circuitry is employed to extract timing and positioning information from the servo tracks.

Another servo system, exemplified by U.S. Pat. No. 3,691,543 to Mueller employs tripulses and circuitry for extracting timing and position information therefrom.

Still another system, with which the present invention is particularly useful, is known as the monopulse system. In such system there are alternating odd and even servo tracks, each track being composed of a series of frames. Each such frame includes a pair of sync pulses that are spaced from one another by a prescribed relatively short interval; each frame also includes one or more position pulses spaced from the sync pulses and from each other by a second relatively long interval. The sync pulses on adjacent tracks are spaced in substantial radial alignment and distinction between odd and even position pulses is made by measuring the time of occurrence of the position pulses with respect to the sync pulses. For accurate timing and positioning it is thus important to produce timing pulses of uniform duration for all tracks and for all relative speeds between the tracks and the servo head.

A prior art system for producing timing pulses in a monopulse servo system employs a monostable multivibrator which produces a timing pulse of fixed duration. Such prior art system generates accurate timing information when the disc speed is constant. When the disc speed varies, however, production of accurate timing information suffers. Moreover, such prior art system is sensitive to noise.

SUMMARY OF THE INVENTION

The present invention provides a system for extracting timing information from a series of repetitive pulses so as to produce output pulses of substantially constant width irrespective of the frequency of the incoming series of repetitive pulses, such output pulses being useful for synchronizing a phase locked oscillator (PLO) that is used for generating clock pulses in a disc pack data storage system. According to the present invention, there is a circuit, such as a monostable multivibrator, which produces a timing signal having a duration corresponding to the interval between two sync pulses in the recurring series of pulses and less than the interval between other pulses in the series. A feedback circuit is employed to effect adjustment of the duration of the timing signal to accommodate varying frequencies, the magnitude of the feedback being based on the duration of the output pulse and tending to maintain such duration constant.

More particularly, the invention provides a circuit arrangement which initiates the output pulse in response to coincidence of the timing signal and the leading edge of a pulse in the recurring series. The output pulse is terminated in response to and concurrently with the termination of the timing signal. The output pulse is fed back through a feedback circuit to the monostable multivibrator to alter the duration of the timing signal produced by the monostable multivibrator in a direction such as to maintain constant the width of the output pulse. The feedback circuit includes an operational amplifier (op amp) having a capacitive feedback so that the op amp functions as an integrator. This reduces the response time or band width of the feedback circuit so as substantially to decrease sensitivity to noise on the servo tracks with which the system is used.

An object of the invention is to provide a timing pulse generator which can adapt to varying frequencies of the input pulses supplied thereto. This object is achieved by providing a timing signal generator, such as a monostable multivibrator, and by providing a feedback circuit for varying the duration of the timing signal produced thereby in accordance with the duration of the output signal.

Another object of the invention is to provide a system of the type referred to above which is substantially insensitive to noise. This object is achieved by the present invention because the feedback circuit employs an op amp connected in an integrator configuration so as to reduce the effect of random noise pulses on the feedback signal.

Although the invention is described hereinafter in connection with a monopulse servo system in disc pack data storage apparatus, the invention is not limited to such environment; the invention may be employed to advantage in extracting timing information from a series of recurring pulses in other environments.

The foregoing together with other objects, features and advantages will be more apparent after referring to the following specification and the accompanying drawing.

BRIEF DESCRIPTION OF THE DRAWING

FIG. 1 is a block diagram of a preferred embodiment of the invention.

FIG. 2 is a timing diagram indicating signal conditions in various parts of the system.

DESCRIPTION OF THE PREFERRED EMBODIMENT

Referring more particularly to the circuit of FIG. 1 there is an input terminal 12 which is coupled to servo head circuitry associated with the disc pack data storage apparatus. The specific nature of the series of pulses supplied to input terminal 12 will be described in more detail hereinbelow in conjunction with FIG. 2.

Input terminal 12 is connected to an inverting input 14 of a monostable multivibrator 16. The monostable multivibrator is a well known device which produces on an output lead 16Q a timing signal formed by a high or first logic level that has a duration determined by circuit elements associated with the monostable multivibrator. In the present case the primary duration determining element is a capacitor 18. The capacitor beings to charge when the multivibrator is triggered by the trailing or negative going edge of a pulse applied to inverting input 14. When capacitor 18 accumulates a prescribed charge circuitry internal of the multivibrator causes the signal at output 16Q to return to a low or second logic level.

Output lead 16Q is connected to the data input 20D of a data flip flop 20. Data flip flop 20 also has a clock input 20C, an inverted reset input 20R and an output 20Q. A data flip flop operates by receiving a logic signal at the D input, transferring that signal to the Q output in response to application of a clock pulse to the C input, and resetting the Q output in response to application of a signal at the reset or R terminal thereof. The output pulse produced by the circuit of the invention appears on terminal 22 which is connected to flip flop output 20Q.

Flip flop output 20Q is also connected to the input of a feedback circuit that includes a buffer 24 which presents a very high reverse impedance so that circuitry connected to the output thereof will not be influenced except when flip flop output 20Q is in a high state. Connected to the output of buffer amplifier 24 is a network including a resistor 26 which is connected to the plus (+) input of an operational amplifier 28. Resistor 26 is also connected to a common point 30 of a resistor 32 connected to a negative voltage source and a grounded filter capacitor 34.

For feeding back the output of op amp 28 to the negative input is a feedback path including a capacitor 36 and a grounded resistor 38. The output of the op amp, a voltage having a magnitude proportional to the duration of the output signal appearing on flip flop output 20Q, is connected through a diode 40 to the input of a voltage-to-current converter 42. The output of converter 42 is connected via a conductor 44 to one terminal of timing capacitor 18 so that current flow through conductor 44 into the capacitor decreases the time required for the capacitor to charge and therefore decreases the duration of the timing signal produced by monostable multivibrator 16 at output 16Q.

Before describing in detail the operation of the circuit of FIG. 1 a description of a typical monopulse servo system will be given. The servo surface in the disc pack apparatus is formed with a plurality of concentric tracks which are alternately odd tracks and even tracks. As seen in curve A of FIG. 2, which represents the signal induced into a servo head in response to relative movement between an odd servo track and the servo head, there is a first odd sync pulse $S_{1o}$, a second odd sync pulse $S_{2o}$ and one or more odd position monopulses $P_o$. As can be seen in curve A of FIG. 2 sync pulses $S_{1o}$ and $S_{2o}$ occur at a relatively short interval as compared to the interval at which odd position monopulses $P_o$ occur. Curve B of FIG. 2 shows the signal induced in a servo head by relative movement of an even servo track relative thereto. There are even sync pulses $S_{1e}$ and $S_{2e}$ which are induced concurrently with corresponding signals in the odd servo track and there is one or more even position monopulses $P_e$. The interval between sync pulses $S_{1e}$ and $S_{2e}$ is short compared with the interval between signals $P_e$.

The odd and even signals are combined, either in the servo head or elsewhere, and are rectified to produce a signal shown in curve C in FIG. 2. The signal of curve C includes combined sync pulses $S_{1c}$ and $S_{2c}$ as well as position pulses $P_o$ and $P_e$. The condition represented by curve C occurs when the servo head is radially positioned midway between an odd servo track and an even servo track. The magnitude of signal $P_o$ or $P_e$ will increase or decrease as the servo head moves from such position. Circuitry not part of the present invention detects the relative magnitude of position signals $P_o$ and $P_e$ and repositions the servo head as may be desired.

The signal of curve C is digitized by conventional circuitry, not shown, so as to square off the signals; there is a signal $S_1$, a signal $S_2$ and position signals $P_o$ and $P_e$. The portion of curve D from the leading edge of sync signal $S_1$ to the leading edge of the succeeding sync signal $S_1$ is characterized as a frame. In one servo track there are typically thousands of such frames. The times indicated on the abscissa of curve D are typical of a system designed in accordance with the invention.

The trailing edge or negative-going portion of the digitized pulses, which are coupled through input terminal 12 to inverted input 14 of monostable multivibrator 16, trigger the multivibrator and cause the output at 16Q to go high. The output of the multivibrator constitutes a timing signal and is shown in curve F of FIG. 2.

When monostable multivibrator 16 is triggered, the amplifier voltage in the timing circuit thereof (not shown) increases as shown in curve E of FIG. 2 as a function of the charge accumulated in timing capacitor 18. When the charge on capacitor 18 reaches a prescribed level and the voltage shown in curve E reaches a magnitude $E_r$, the multivibrator output at 16Q is reset.

When output 16Q of monostable multivibrator 16 is in a high logic state, such phenomenon is stored in data flip flop 20 because the output of the monostable multivibrator is connected to the D input of the flip flop. This has no influence at flip flop output 20Q in absence of a clock pulse at clock input 20C. Referring now to curve D and F, it will be seen that when sync pulse $S_2$ goes positive, such constitutes a clock pulse at clock input 20C of flip flop 20 so that the phenomenon stored in the flip flop is transferred to output 20Q, thereby initiating the ouput pulse as at 46. When the monostable multivibrator times out, its output 16Q goes to a low state, and because such signal is connected through inverting reset input 20R, flip flop 20 is reset, thereby terminating the output pulse as at 48. In response to the trailing, negative going edge of sync pulse $S_2$, monostable multivibrator 16 is again triggered. However, because the monostable multivibrator times out before occurrence of the leading edge of pulse $P_o$, data flip flop 20 is reset before it is clocked, and no output signal occurs at output 20Q. The output pulse shown in curve G appears at output terminal 22; the output signal can be connected to the input of a phase locked oscillator (PLO). Because the width or duration of the output pulse is substantially constant irrespective of the frequency of the pulses, the PLO output is stable and substantially free from phase jitter.

Output pulse 20Q is also connected through buffer amplifier 24 to resistor 26; when pulse 20Q occurs, a current flows through resistor 26 and resistor 32 to the $-V$ power source. This in turn causes the voltage on the positive terminal of op amp 28 to rise in consequence of which the voltage output of the op amp increases. Because of the capacitive feedback provided by capacitor 36, the op amp acts as an integrator so that the op amp output changes gradually as the width of the output pulse changes. The consequence of the gradual change in the output of the op amp is that the system is substantially insensitive to noise. The op amp voltage signal is converted to a current by converter 42. The current is injected into capacitor 18 so as controllably to reduce the time necessary to time out monostable multivibrator 16. Thus the feedback system alters the timing of monostable multivibrator 16 so that the multivibrator times out after an interval corresponding to the interval between sync signals $S_1$ and $S_2$, which interval is less than the interval between signal $S_2$ and the position signals or between adjacent position signals.

In further explanation of the operation of the feedback system in reducing the sensitivity of the circuit to noise reference in made to FIG. 2 wherein a noise pulse 50 is produced in the servo head as a result of a defect or imperfection on the odd servo track. Such noise pulse is digitized as shown at 52 in curve D and thus clocks data flip flop 20 while monostable multivibrator output 16Q is high. This produces in the output 20Q an extraneous pulse shown at 54 in curve G. The presence of pulse 54 has but slight effect on the magnitude of the current injected into capacitor 18 through conductor 44, because the output of op amp 28 is the time integral of the input thereof. Thus the change produced in the output of the op amp in response to the presence of noise pulse 54 has insignificant effect on the interval between leading edge 46 and trailing edge 48 of the output pulses. Moreover the presence of a single pulse, such as pulse 54, that is out of time has virtually no effect on the PLO to which output terminal 22 is connected.

That the circuit embodying the present invention produces an output pulse which has a constant width irrespective of frequency variations can be appreciated by considering, in reference to FIG. 2, the case where the frequency increases and the case where the frequency decreases with respect to that depicted in the figure. As the frequency increases, the leading edge of sync pulse $S_2$ (see curve D in FIG. 2) tends to move closer to sync pulse $S_1$, i.e., toward the left as viewed in the figure. This causes the leading edge 46 of the output pulse to move in a corresponding direction so that the width of the ouput pulse tends to increase. Consequently, the voltage output of op amp 28 will increase and will effect a corresponding increase in the magnitude of the current supplied to capacitor 18 through the feedback circuit including conductor 44. In consequence of such increased current flow, capacitor 18 reaches the prescribed state of charge earlier so that monostable multivibrator 16 times out earlier. This has the tendency to move the negative-going portion of the monostable multivibrator output to the left as viewed in curve F of FIG. 2. This in turn causes the trailing edge 48 of the output pulse to move to the left and to cause reduction in the width of the output pulse to a condition assumed to exist before occurrence of the frequency increase.

A reduction in frequency increases the time between sync pulses $S_1$ and $S_2$ thereby causing the leading edge of pulse $S_2$ to move toward the right as seen in curve D of FIG. 2. This causes a reduction in the width of the output pulse because leading edge 46 moves to the right. The reduction in the width of the output pulse is manifested by a decrease in the magnitude of the current fed back to capacitor 18. Consequently the time for monostable multivibrator 16 to time out is increased thereby moving the trailing edge of multivibrator output 16Q (see curve F in FIG. 2) toward the right. Negative-going portion 48 of the output pulse will experience a corresponding movement thereby increasing the width of the output pulse to that existing before the assumed frequency decrease.

Thus it will be seen that the present invention provides a pulse discriminating system which develops from a series of recurrent pulses a single timing pulse which has a substantially constant duration irrespective of the frequency of the recurring pulses. Accordingly the circuit can be used to advantage in deriving timing information from a monopulse servo system in a disc pack data storage device so as to afford generation of accurate and stable sync pulses.

Although one embodiment of the invention has been shown and described it will be obvious that other adaptations and modifications can be made without departing from the true spirit and scope of the invention.

What is claimed is:

1. A circuit for generating an output pulse from a recurring pulse pattern having two adjacent pulses that occur at a first interval and one or more additional pulses that occur at a second interval that is longer than the first interval, the circuit comprising means for producing a controllably variable timing signal, said timing signal producing means having an input coupled to said pulse pattern and being constructed and arranged to initiate said timing pulse in response to the trailing edge of the pulses in the pulse pattern, means responsive to coincidence of said timing signal and the leading edge of a pulse in the pulse pattern for initiating said output pulse, means responsive to termination of said timing signal for terminating said output pulse, and feedback means coupling said output pulse to said timing signal producing means and including means for generating a feedback signal having a magnitude representative of the duration of said output pulse, said timing signal producing means being constructed and arranged to effect reduction of the duration of the timing signal by an amount corresponding to the magnitude of said feedback signal so as to maintain substantially constant the width of said timing pulses notwithstanding variations in the frequency of the pulses in said pulse pattern.

2. A circuit according to claim 1 wherein said feedback signal generating means includes integrator means for integrating the output signal over time so as to decrease the rate of variation of said feedback signal in response to changes in the duration of said output signal, thereby to reduce the sensitivity of said circuit to noise in the pulse pattern.

3. A circuit according to claim 1 wherein said timing signal producing means includes a monostable multivibrator connected to be triggered by the trailing edge of pulses in the pulse pattern and having an output producing said timing signal, said monostable multivibrator having a timing capacitor connected to accumulate a charge and to reset said monostable multivibrator output when said capacitor accumulates a prescribed charge, and wherein said feedback means includes means for injecting charging current into said capacitor at a level corresponding to the magnitude of said feedback signal so as to reduce the duration of said timing signal in response to increase in the duration of said output pulse.

4. A circuit according to claim 1 wherein said output pulse initiating means includes a data flip-flop having a data input connected to said timing signal, a clock input connected to said pulse pattern, and an output at which said output signal is generated, said data flip-flop having an inverting reset input connected to said pulse pattern and constituting said output pulse terminating means.

5. A circuit for generating an output pulse from a recurring pulse pattern having two adjacent pulses that occur at a first interval and one or more additional pulses that occur at a second interval that is longer than the first interval, the circuit comprising a monostable multivibrator having an input terminal coupled to the recurring pulse pattern, means producing a first logic level in response to said pulses, a timing circuit having a capacitor, means responsive to a pulse at said input terminal for supplying a charging current to the capacitor, and means responsive to attainment of a preselected charge on said capacitor for resetting said monostable multivibrator to a second logic level; means coupled to said recurring pulse pattern and to said monostable multivibrator for producing an output pulse commencing in response to coincidence of said first logic level and the leading edge of one of said recurring pulses and terminating in response to resetting said monostable multivibrator to said second logic level; and feedback means for coupling said output pulse to said capacitor, said feedback means including means for injecting current into said capacitor at a level corresponding to the duration of said output pulse, said duration being sufficient to reset said monostable multivibrator after expiration of said first interval and before expiration of said second interval so that the duration of said output pulse is substantially constant irrespective of the frequency of said recurring pulse pattern.

* * * * *